Figure 1:
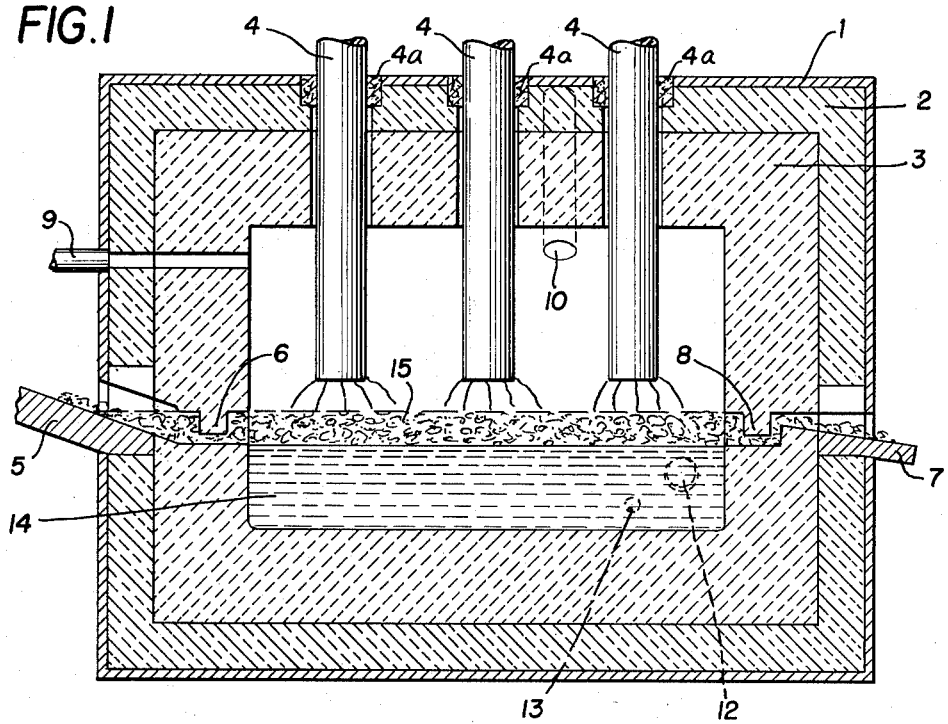

Aug. 9, 1955

W. H. OSBORN 2,715,062

METHOD OF TREATING ZINC SLAGS

Filed Feb. 28, 1952

INVENTOR.
WILLIAM HENRY OSBORN
BY
Furman Rinehart.

ATTORNEY

United States Patent Office 2,715,062
Patented Aug. 9, 1955

2,715,062

METHOD OF TREATING ZINC SLAGS

William Henry Osborn, New York, N. Y., assignor to Phelps Dodge Corporation, New York, N. Y., a corporation of New York Application February 28, 1952, Serial No. 273,970

5 Claims. (Cl. 75—14)

This invention relates to the recovery of zinc as metallic zinc vapors from zinciferous materials such as silicate zinc slags which result from the smelting of copper or lead ores or from scrap materials containing zinc. More particularly the invention relates to recovery of zinc and other metallic values from ferruginous silicate slags.

The invention provides a process for the recovery of zinc and other metal values from slags which may be advantageously practised in an electrically heated furnace wherein the slag, containing zinc in oxide form, is maintained in a layer superimposed on a bath of molten iron containing dissolved carbon in controlled amount, such dissolved carbon reacting with the zinc oxide in the slag to form zinc metal vapor and also reacting with the oxides of copper, tin and lead, if present, to reduce these to metals so that these metals may be recovered from the slag.

If a ferruginous silicate slag containing zinc in the form of a combined zinc oxide silicate, and which may also contain other metals such as copper, tin and lead, is brought into contact with molten iron containing carbon under proper conditions, the carbon will reduce the zinc oxide to zinc which at the temperature of molten iron will rise above the bath as zinc vapor. Lead, if present, will also reduce to metal, some of which will volatilize and pass off with the zinc vapor. Copper and tin, if present, will be reduced and being less volatile will enter into the iron bath. To carry out these reactions so that the metal values can be recovered in a practical and economical way from silicate slags containing them presents a number of difficulties.

If the original concentration of carbon in the iron is in excess of the amounts required to reduce the zinc in the ferruginous slag (and copper, lead and tin, if present), iron oxide will also be reduced from the slag and will continue to be reduced to very low concentrations of carbon dissolved in the iron. All of these reactions are endothermic and proceed with great rapidity so long as the slag and molten iron are maintained at a temperature conducive to the reaction. But unless the heat input is carefully controlled to supply the proper amount of heat, the endothermic reaction proceeds at such rate that the iron bath and slag in the furnace become chilled with the result that the slag becomes pasty, gas generated by the reaction can not escape as rapidly as formed, and the slag will "foam" out of control. Even if enough heat can be forced into the furnace, to avoid the chilling effect of the endothermic reactions, in the presence of excess carbon, the iron oxide in the slag will be excessively reduced, and the slag will become too highly siliceous.

Although there has been a proposal in the prior art to recover zinc from ferruginous slags containing zinc by flowing the slag over a molten iron bath in an electrofurnace, the principle upon which that process is based is that the iron in the bath reacts with the zinc oxide in the slag to reduce it to zinc with a corresponding production of iron oxide which enters the slag, this iron oxide then being reduced to iron in another part of the furnace by the addition of coke breeze to the slag; the reduced iron then re-entering the iron bath. In such process the zinc oxide is to be reduced solely by iron from the bath and no effort was made to reduce the zinc oxide in the slag by carbon dissolved in the molten iron bath and what is perhaps even more important is that workers in this field heretofore did not recognize the significant factor of mol ratio of FeO to $SiO_2$ in the slag.

According to my invention ferruginous slag containing zinc is treated in an electric furnace in which the furnace temperature and the reactions are controlled so that substantially all zinc in such a slag is reduced to zinc vapor; and copper and tin, if present, are carried into the iron metal bath from which they may be readily recovered; the zinc oxide and the other non-ferrous metals, such as copper, tin and lead, in the slag being reduced by reaction with carbon dissolved in controlled amount in the molten iron.

According to one method of employing the process of my invention, a thin layer of slag is maintained, either as a batch treatment or as a continuous or semi-continuous flow, over a relatively deep bath of molten iron in a suitable furnace. Carbon is introduced into the molten bath preferably without contact between the introduced carbon and the slag. The carbon dissolves or goes into solution in the iron bath and in that dissolved form becomes spread or diffused through it. Thus the carbon comes into contact with the slag in the form of a dilute solution of carbon in iron. The rate of the reaction between the dissolved carbon and zinc oxide, forming carbon dioxide and carbon monoxide gas, is governed by the concentration of the carbon dissolved in the iron metal bath and the concentration of zinc oxide in the slag and also other metallics to be recovered, such as copper, lead and tin, if present. Also, the rate of reaction between the carbon dissolved in the iron bath and the iron oxide present in the slag is affected by the concentration of carbon in the molten iron. The concentration of carbon in the iron bath is controlled or adjusted so that it will not rise to a point where the rate of endothermic reduction of oxides in the slag is greater than the rate of heat input to the furnace and sufficient carbon is added to the iron as the endothermic reducing action proceeds to reduce the zinc oxide in the slag to zinc vapor; and if copper, tin and lead oxides are present, sufficient carbon is added to reduce these to metals and also to reduce a predetermined amount of iron oxide in the slag to iron metal.

The temperature maintained in the furnace must be above the melting point of the iron bath. The melting point of pure iron is generally given as 2786° F. which is, of course, lowered by alloying impurities. Generally speaking, a temperature of the order of 2750° F. to 2800° F. will suffice to keep the iron safely molten. While it is possible to raise the furnace temperature higher than this, it is not usually advisable because of the corrosive tendencies of slag at very high temperatures. The furnace temperature should not be lowered below the melting point of the iron bath.

The amount of carbon to be added to the molten iron can be calculated very closely or exactly if the exact analysis of the slag and the exact temperature of the bath are known. If the slag being treated is one which does not contain material quantities of recoverable non-ferrous metals other than zinc; that is, if the slag contains zinc oxide and no copper, tin or lead, the amount of carbon added to the molten iron bath is that amount which will react with the zinc oxide. In this case the mol ratio $FeO/SiO_2$ in the slag preferably is not varied. In other words, none of the iron oxide in the slag is reduced and the amount of molten iron in the bath remains the same; the amount of dissolved carbon in the iron bath being regulated to supply the amount necessary to react with and reduce only the zinc oxide in the slag. In such a case, in practising the process as a continuous one, the amount of carbon to be added for dissolution in the molten iron bath may be determined and controlled for practical purposes by adding that amount which will maintain the iron bath at a substantially predetermined level during the operation of the furnace. That is, as dissolved carbon is removed from the molten iron bath as a result of the reducing reaction, carbon is added to the bath in regulated amount sufficient to replenish the dissolved carbon which is removed from the bath. If no carbon is added to the iron bath and the reducing reactions proceed, the zinc will be vaporized according to the reaction:

$$Fe + ZnO \longrightarrow FeO + Zn \uparrow_{vapor}$$

In this case the amount of iron in the bath will decrease and will have to be replenished from an outside source. If an excess of carbon is added, the depth of the iron bath will increase because more iron oxide in the slag will be reduced and excess iron will have to be tapped from the furnace.

Accordingly, the process when carried out in accordance with the invention contemplates regulating the amount of dissolved carbon in the iron bath so that the reactions will proceed at a rate which is in balance with heat input to maintain the iron bath molten while at the same time reducing reactions in the slag proceed at a rate and to an extent which reduces the zinc oxide in the slag to zinc metal without disrupting the uniform and steady operation of the furnace. One way of accomplishing this desirable end in practising the process of the invention is to supply heat input to the furnace concurrently as the endothermic reduction reactions proceed in the slag and to supply additional carbon to the bath concurrently as dissolved carbon is removed from the iron bath as a result of the reduction reactions; the additional carbon being added to the bath at a rate which will maintain the concentration of dissolved carbon in the bath at a level which will cause the endothermic reduction reactions in the slag to proceed at a rate commensurate with but not exceeding the heat input capacity of the furnace.

If the ferruginous slag contains other non-ferrous metal oxides in recoverable values, in addition to zinc oxide, which is usually the case, then the amount of carbon added for dissolution in the iron bath is increased. For example, certain blast furnace slags may contain copper and tin in addition to zinc in the form of oxides; or the slag may also contain lead. In such case sufficient carbon is added to the iron bath to reduce the zinc oxide and all of these other recoverable non-ferrous metals and also to reduce sufficient iron oxide from the slag to produce from the slag itself an amount of iron about two and one-half to three times the amount of those other non-ferrous metals, such as copper, tin and lead, which are reduced from the slag. In this case, the amount of iron bath increases by reason of the addition to it of the non-vaporized metals, including iron, reduced from the slag. Excess of the bath may be withdrawn from the furnace from time to time or continuously. If any lead vapor is formed, it can be drawn off with the zinc vapor and selectively condensed.

If copper, lead or tin is present in the slag, the reduction action, as stated, not only reduces the zinc oxide but, also, the copper, lead and tin oxides together with iron oxide. It is one of the features of my invention that sufficient carbon is added at a rate and in controlled amount to maintain a predetermined mol ratio of $FeO/SiO_2$ in the slag. If, for example, the ferruginous slag contains copper and tin, I have found that as much as 30% copper plus tin can be held in molten alloy suspension in the bath without adversely affecting the reduction of zinc from the slag. An alloy of 30% copper plus tin, and 70% iron, is a suitable charge for a Bessemer copper converter. Consequently, if the slag contains copper and/or tin, the amount of carbon added to the molten iron bath as the reactions proceed is the amount which is sufficient to reduce all the zinc and the copper and/or tin oxides present in the slag plus the amount of carbon which will reduce sufficient iron oxide in the slag to produce from the slag itself approximately two and one-half to three times as much iron as copper plus tin removed from the slag. Then as the amount of molten iron bath (containing the non-ferrous metals mentioned) increases, the excess may be tapped out continuously or intermittently, and the copper and tin may be recovered from the iron by known methods. In a large scale operation in which the furnace is of large capacity and the copper plus tin content of the slag is high, the molten iron containing a high copper and tin molten alloy may advantageously be tapped off in a continuous stream for further treatment and recovery of the copper and tin.

The effect of the addition of carbon to the molten bath when treating a ferruginous slag containing copper and tin is shown in the following table (Table I) wherein is shown the reduction of mol ratio $FeO/SiO_2$ with varying amounts of carbon added per pound of slag charged to the furnace. In this series of tests on a small scale, using a single phase series-arc furnace, the furnace was charged with 65 pounds of low carbon iron and thereafter 10 pounds of cold shotted slag added to it at the rate of one pound every four minutes. The iron bath was kept molten and carbon was added to the iron bath in the form of a one-inch diameter carbon rod (the rod being of a kind commonly used as an electrode). Heat input to the furnace was supplied concurrently as the reduction reactions proceeded in the slag. The carbon rod was introduced through a suitable hole in the wall of the furnace into the iron bath out of contact with the slag and pushed forward into the bath a distance equivalent to the weight shown in Table I once every four minutes. The original slag contained 6.69% zinc and a mol ratio $FeO/SiO_2$ of 1.22.

TABLE I

| Test No. | Lbs. Carbon Added per Lb. of Slag | Mol Ratio $FeO/SiO_2$ | Percent Zinc in Final Slag | Percent C in Metal Bath |
|---|---|---|---|---|
| 12S | 0. | 1.98 | 0.59 | |
| 17S | .012 | 1.15 | 0.36 | .096 |
| 18S | .018 | 0.975 | 0.36 | .074 |
| 19S | .024 | 0.845 | 0.14 | .106 |

The results of these tests show the significance of the addition of carbon to the iron bath and its effect on mol ratio $FeO/SiO_2$ for it may be seen that the addition of as much as .024 lb. of carbon per lb. of slag lowered the mol ratio $FeO/SiO_2$ to approximately 70% of its original mol ratio and this produced a very sticky slag and caused considerable foaming of the bath.

The reaction between zinc oxide and carbon to form zinc vapor results in the production of carbon dioxide and carbon monoxide and at the temperatures of molten iron, i. e., 2750° F.–2800° F., the reaction produces a high ratio of carbon dioxide to carbon monoxide. Since these gases must pass off from the furnace along with the zinc vapor the carbon dioxide tends to react with the zinc vapor before the zinc vapor can be condensed with the result that the zinc vapor tends to oxidize from metallic zinc to zinc oxide with the formation of carbon monoxide. This follows according to the reversible equation:

$$Zn + CO_2 \rightleftarrows ZnO + CO$$

which moves to the right as the temperature is lowered. In order to inhibit this unwanted reoxidization in practising the process of the invention, a reducing gas such as a hydrocarbon gas which may advantageously be butane or propane or other similar reducing agent is introduced into the furnace preferably above the slag level while the reducing reactions in the slag proceed. The reducing gas reacts with the carbon dioxide at high temperature to form carbon monoxide and thus inhibits the reoxidation of the zinc vapor during its cooling before condensation. However, if such a reducing gas is not introduced into the furnace to reduce the carbon dioxide in the electro-furnace, the latter will in part react with the carbon of the electrodes which are exposed to the furnace atmosphere to form carbon monoxide and this brings about an undesirable and unwanted consumption or wasting away of the electrodes.

In practising the process of the invention, it is preferable to maintain the layer of slag overlying the molten iron bath at a minimum depth. However, the depth should be sufficient to maintain a continuous slag layer over the whole hearth area and of sufficient depth to effectively seal the furnace at the slag charging and tapping holes. The slag layer may be as thin as one to one and one-half inches and preferably should be maintained at a depth less than four inches. The depth of metal bath below the slag layer may be varied over a wide range, depending on furnace size and structure, rate of heat input, and the like. But, in general, the weight of metal bath in the furnace should be 8 to 50 times the weight of the slag in the furnace to prevent local freezing of the bath and to insure uniform distribution and diffusion of its dissolved carbon content.

Control and regulation of the concentration of carbon present in the iron bath is also important. If too much carbon is present, there is a tendency to form excessive amounts of gases and, what is more undesirable, the reduction of the zinc oxide may be so rapid that the heat supplied will be rapidly exhausted, by reason of the endothermic reaction, with consequent rapid cooling of the molten mass. This may result in the production of large quantities of foam and even partial solidification of the slag or iron bath to an extent which makes it impossible to control the reactions. The solution of carbon in the iron bath should be dilute and, as a general rule, should not exceed the order of 0.5% carbon dissolved in the iron. On the other hand, sufficient carbon should be present in the iron to carry on the desired reactions so that the amount of dissolved carbon should not be less than of the order of 0.05%. In the case of ferruginous silicate slags where the mol ratio $FeO/SiO_2$ is from 1.5 to 0.8, it is preferable that the percentage of carbon in the iron bath be of a low concentration, of the order of 0.07% to 0.1%.

However, it is significant to note that my invention comprehends a process wherein the concentration of dissolved carbon in the molten iron bath is regulated or controlled so as to maintain an amount of dissolved carbon in the bath as the endothermic reduction reactions go forward in the slag which will provide a rate of endothermic reduction reaction which is commensurate with the rate and amount of heat which is supplied to the furnace concurrently as the reduction reactions proceed in the slag. For example, if the furnace has a given heat input and heat is supplied concurrently in given amount as the endothermic reduction reactions proceed in the slag, thereby concurrently removing dissolved carbon from the bath, additional carbon is concurrently added to the bath so as to maintain dissolved carbon in the bath in an amount which will cause the endothermic reactions to proceed concurrently at a rate which takes up heat from that concurrently supplied by the given heat input but not more. It will be understood, of course, that any furnace will be subject to radiation and other such heat losses. Hence in speaking of heat input being in balance with the endothermic reactions, it is intended to mean heat input over and above that which is lost by radiation or otherwise from the walls of the furnace.

The control and regulation of the carbon maintained in the molten iron at high dilution may be effected by introducing carbon directly into the iron bath as needed to maintain the desired concentration of carbon in the bath. Although the carbon may be added to molten iron outside the furnace and the solution of carbon in molten iron then introduced into the furnace while withdrawing excess iron from the furnace to be replaced with the molten iron containing the needed dissolved carbon, I have found that the carbon may be conveniently added to the bath out of contact with the overlying slag through suitable carbon charging apertures in the walls of the furnace. Although other forms of carbon-containing reducing agents may be used and introduced directly into the molten iron bath through such apertures and out of contact with the slag, carbon in the form of carbon or graphite rods have been found to be a very convenient and desirable form. For example, carbon rods known in the trade as Soderberg electrodes (widely used as electrodes in electric furnaces), or other similar forms of carbon or graphite rods are admirably suited for use as the source of carbon in practising the process of the invention because they can be passed through suitable apertures in the wall of the furnace so that their inner ends extend into the molten bath and they can be moved forward with facility in controlled fashion to supply additional carbon as needed to replenish dissolved carbon in the bath as the carbon is depleted from the bath by reason of its entering into the reducing action in the slag. The needed additional carbon is dissolved into the bath from the immersed end of the rod which may be moved into the bath the proper distance and at the proper rate to permit carbon to be dissolved therefrom to replace the carbon used up from the bath in the reduction reactions. In case a furnace of large capacity is used, a number of carbon rods may be extended into the bath at different points in the furnace to insure uniform distribution of dissolved carbon throughout the iron bath. In this manner the concentration of dissolved carbon may be maintained constant.

It is important particularly to maintain the concentration of carbon in the bath substantially constant because if the carbon becomes depleted the zinc oxide in the slag will react with the iron to form zinc vapor and iron oxide according to the equation:

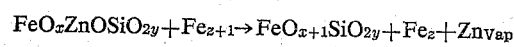

$$FeO_xZnOSiO_{2y} + Fe_{z+1} \rightarrow FeO_{x+1}SiO_{2y} + Fe_z + Zn_{vap}$$

This reaction is highly endothermic. It will not move to the right to produce metallic zinc beyond limits of the ratio of FeO/ZnO which preclude satisfactory zinc recovery from slags which are initially high in iron oxide content. Thus, this source of zinc reduction is controlled by the temperature of the furnace and by the initial ratio of iron oxide to zinc oxide in the slag. Should the carbon content of the molten bath not be maintained at proper level, the high endothermic reaction stated in the above equation may result in undue cooling of the furnace with unwanted and possible solidification of the molten mass.

Figure 2:
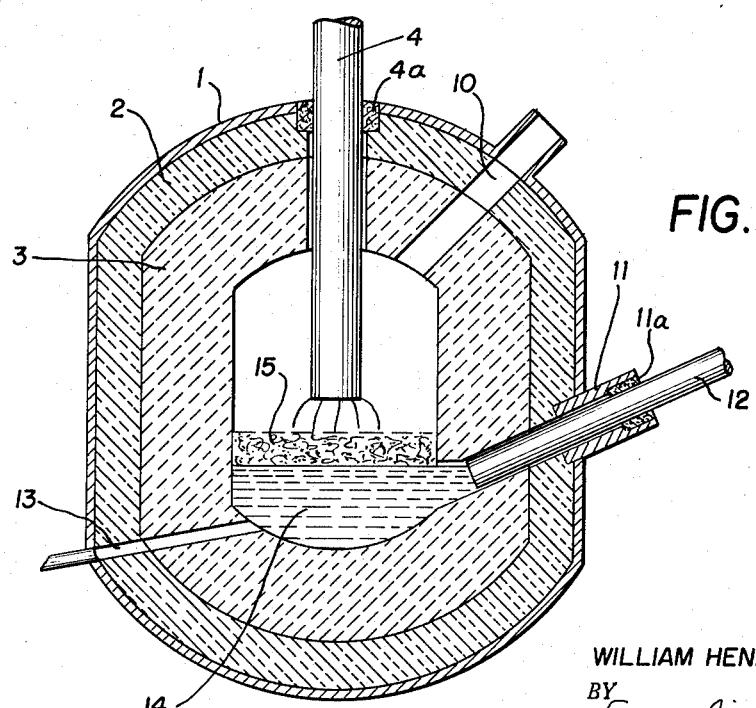

Although the novel features which are believed to be characteristic of the invention are pointed out in the claims annexed hereto, the invention itself as to its objects and advantages and the manner in which it may be carried out may be better understood by reference to the examples hereinafter set forth, as well as to the foregoing description, taken in connection with the accompanying drawing forming a part hereof which illustrates in schematic form a furnace in which the process may be practised; Fig. 1 being a longitudinal section and Fig. 2 being a transverse section. But it will be understood that the process of the invention may be practised in a variety of electro-furnaces whether of the induction, direct-arc or series-arc type.

The furnace, as shown in the drawing, is a conventional three phase A. C. electric furnace of the series-arc type with such modifications as are desirable. The furnace shell 1 is lined with insulation 2 and a suitable refractory 3. Carbon electrodes 4 pass through apertures in the wall through packing glands 4a into the furnace and are connected in conventional manner through transformers (not shown) to a source of current (not shown), so as to form arcs in which the current passes from the electrodes to the molten iron bath 14 and back to the adjacent electrode. This is a standard type of electrical connection for heating purposes in furnaces known as the series-arc type. The shell and walls have an inclined slag launder 5 through which slag can be flowed into the furnace under a slag bar 6 which with the slag layer 15 forms a seal which prevents escape of gases from the furnace. A discharge launder 7 is provided for tapping off spent slag, a slag bar 8 being provided to form a seal which prevents escape of gases from the furnace. The furnace has a pipe 9 through the wall through which a reducing gas, such as a hydrocarbon gas (for example, propane or butane) may be introduced above the level of the slag layer 15.

Zinc vapor and furnace gases are withdrawn through a vapor conduit 10 which may be located in the arch or the side wall of the furnace; and connected to a zinc condenser, not shown. Zinc condensers are, of course, well known in the art. A suitable inclined carbon introducing conduit 11 in the wall of the furnace, having a packing gland 11a, has its outer end above the surface of the slag layer 15 and its inner end below the slag layer. Carbon is introduced into the iron bath through this carbon introducing conduit. As shown, carbon in the form of a carbon rod 12, slidable in the conduit 11, is used as the source of carbon. The carbon rod can be controllably advanced at any desired rate into the molten bath. This may be done manually or, if desired, by suitable mechanism.

A tap hole 13 is provided through which molten metal from the molten bath 14 may be tapped off intermittently or continuously as desired. Although a carbon rod 12 has been shown in the drawing, carbon in other forms, such as coke or other suitable carbon-containing reducing agent, may be passed through the carbon charging conduit 11 and controllably introduced into the molten bath 15.

*Example 1*

To an electric furnace of the series-arc type, having a hearth area of approximately one square foot, 65 pounds of molten structural steel was charged. Upon this layer of molten iron 20 pounds of slag were charged in one pound increments at four-minute intervals. The mol ratio of iron oxide to silica in the slag was 1.22. At the time of introducing the slag, the temperature of the furnace was just sufficient to hold the steel charge in a molten condition. The temperature of the metal bath at the end of the run was 2750° F. A carbon (graphite) rod was inserted through an aperture in the side of the furnace so that its end extended into the molten iron layer. This rod which was one inch in diameter was advanced three-eights of an inch into the furnace per pound of slag introduced. Propane was passed into the furnace above the slag layer at the rate of 0.02 cubic foot per minute. The zinc vapor from the run was drawn off through a take-off in the top of the furnace and condensed. The slag contained initially 6.69% zinc. The initial copper and tin percentages were 2.6% and 0.75% respectively. About eight minutes after the last increment of slag had been added, the slag was tapped from the furnace. During this run 0.248 pound of carbon was taken up by the molten iron prior to the addition of the slag and 0.360 pound of carbon was taken up by the iron during the eightly minutes of slag treatment in the furnace. At the end of the run, the iron contained 0.071% carbon. The final or residual slag was found to contain 0.36% zinc, 0.02% of copper and 0.06% of tin. The spent slag was found to contain a mol ratio of iron oxide to silica of 0.975.

*Example 2*

In accordance with the general procedure of Example 1, the following semi-continuous nineteen-hour run was made. The temperature in the electric furnace was maintained so as to keep the iron bath molten. The slag was continuously fed into the furnace by a screw-type feeder at the rate of 10 pounds per hour and intermittently tapped at one-hour intervals. After furnace balance had been established, carbon was added to the metal bath at the rate of 0.012 pound per pound of slag. There was charged a total of approximately 193 pounds of slag over the nineteen hours and 166.7 pounds of spent slag were removed. The ingoing slag contained:

| Metal | Average Percentage |
|---|---|
| Zinc | 5.38 |
| Copper | 1.18 |
| Iron | 31.24 |
| Silica | 32.22 |

The spent slag withdrawn was found to contain:

| Metal | Average Percentage |
|---|---|
| Zinc | 0.37 |
| Copper | 0.24 |
| Iron | 26.43 |
| Silica | 35.39 |

As stated in the foregoing, the copper plus tin content of the molten iron bath may reach as high as 30% without seriously slowing down the desired reduction reaction. When the concentration of copper plus tin in the iron bath reaches the neighborhood of 30% the iron containing the copper and tin may be drawn off and treated to recover the copper and tin by known methods. The iron, copper-tin material withdrawn from the furnace may be replenished with iron free of copper and tin, bearing in mind, however, that if iron is reduced from the iron oxide in the slag it will enter the molten iron layer. The withdrawn material, which may contain 2.5 to 3 parts iron to one of copper plus tin, can be charged direct to a Bessemer type copper converter where the iron is oxidized and slagged off. Or the molten iron containing the copper and tin can be saturated with carbon outside the furnace in which case the carbon will reduce the solubility of the copper and tin so that two liquid phases are produced, one of which is very high in copper and tin content. Further treatment by known methods can be utilized for recovery of these metals. Accordingly, the invention provides a process which is capable of effecting substantially total recovery of zinc as condensed zinc vapor and of the copper and tin. I have consistently recovered from the slag all but 0.1% or less of these metals and reduced the zinc content of the slag to below 0.4%.

It will be seen from the foregoing that the process of the invention, in addition to being suited to batch or intermittent or semi-continuous operation, is particularly well suited for continuous operation wherein the initial slag containing zinc and other recoverable metallic oxides, is continuously introduced into the furnace and passed over and in contact with a molten iron bath in the bottom of the furnace and the spent slag, freed of the desired metallic values, continuously drawn off from the furnace; because the endothermic reducing reactions which remove the metal values from the slag, as it passes through the furnace as a continuously traveling layer, may be effectively controlled with a nicety which eliminates unwanted irregular operation of the furnace due to foaming, on the one hand, or formation of an unduly siliceous or sticky slag on the other.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. The method of removing zinc from silicate slag containing said zinc as oxide for recovery of said zinc as condensed zinc metal which comprises introducing said slag into an electric furnace; passing said slag in the form of a molten layer over and in contact with a molten iron bath in said furnace and containing dissolved carbon thereby effecting an endothermic reduction reaction in said slag between said zinc oxide and said dissolved carbon which forms zinc metal vapor and other gaseous products, and which also removes dissolved carbon from said bath; supplying sufficient heat input into said furnace to maintain said bath molten and at a substantially constant temperature while said endothermic reduction reaction proceeds and supplying sufficient carbon to said bath and at a rate which maintains the concentration of dissolved carbon in said bath at a level between .05% and 0.5% and causes said endothermic reduction reaction to go forward without said reaction absorbing more heat than the heat input into said furnace; withdrawing the gaseous products together with the zinc vapor from said furnace and removing spent slag from said furnace.

2. The method of removing zinc, copper and tin from a slag containing said zinc, copper and tin as oxides which comprises introducing said slag into an electric furnace; passing said slag in the form of a molten layer over and in contact with a molten iron bath in which is maintained a supply of dissolved carbon, thereby effecting an endothermic reduction reaction in said slag between said zinc oxide and dissolved carbon and between said copper and tin oxides and dissolved carbon thereby removing dissolved carbon from said bath and thereby forming zinc metal which rises from said slag as vapor and thereby forming copper and tin which enters into said iron bath and thereby also forming carbon dioxide and carbon monoxide which rise from said slag and thereby also forming spent slag; and, as said reducing reactions proceed, concurrently supplying sufficient heat input into said furnace to maintain said bath molten and at a substantially constant temperature and to furnish heat for said endothermic reduction reactions; adding carbon to said bath in controlled amount sufficient to replenish dissolved carbon removed therefrom as a result of said reducing reactions and at a rate which maintains dissolved carbon in said bath in an amount between .05% and 0.5% which causes said endothermic reactions to proceed at a rate which requires no more heat than that concurrently supplied by said heat input; withdrawing the gases and the zinc in the form of vapor from said furnace; withdrawing the spent slag from said furnace, and withdrawing molten iron containing said copper and tin reduced from copper and tin oxides in said slag.

3. The method of removing zinc, copper and tin from a ferruginous silicate slag having a determinable initial mol ratio of iron oxide to silica ($FeO/SiO_2$) and in which said metals are present as oxides which comprises introducing said slag into an electro-furnace; passing said slag in a layer over and in contact with a molten iron bath containing dissolved carbon, thereby effecting endothermic reactions between said zinc, copper and tin oxides forming zinc metal vapor and reaction gases which rise from said slag and copper and tin which enters into said molten iron bath; supplying sufficient heat input into said furnace to maintain said bath molten and at a substantially constant temperature while said reduction reactions proceed; supplying sufficient carbon to said bath to maintain the concentration of dissolved carbon therein at a level between .05% and 0.5% sufficient to reduce iron oxide in said slag in an amount which reduces said mol ratio to a lower ratio than said initial ratio and sufficient to reduce said zinc, copper and tin oxides to metallic form, said carbon being supplied to said bath by immersing one end of a carbon rod into said bath and advancing said rod into said bath at a rate which maintains said concentration at said level.

4. The method of removing zinc, copper and tin from a ferruginous silicate slag having a predetermined initial mol ratio of iron oxide to silica ($FeO/SiO_2$) and in which said metals are present as oxides which comprises introducing said slag into an electro-furnace; passing said slag in a layer over and in contact with a molten iron bath containing dissolved carbon, thereby effecting endothermic reduction reactions between said zinc, copper and tin oxides forming zinc metal vapor and reaction gases which rise from said slag and copper and tin which enters into said molten iron bath; concurrently supplying sufficient heat input into said furnace to maintain said bath molten and at a substantially constant temperature while said reduction reactions proceed; concurrently adding carbon to said bath to replenish carbon removed therefrom as a result of said endothermic reduction reactions and in an amount sufficient to maintain the concentration of dissolved carbon therein at a level between .01% and 0.5% sufficient to reduce iron oxide in said slag in an amount which reduces said mol ratio to a predetermined amount less than said initial mol ratio and sufficient to reduce said zinc, copper and tin oxides to metallic form, said carbon being added at a rate which causes said endothermic reactions to proceed at a rate which is in balance with the heat input into said furnace.

5. The method of removing zinc, copper and tin from a ferruginous silicate slag having a mol ratio of iron oxide to silica ($FeO/SiO_2$) of greater than unity and containing said metals in oxide form which comprises introducing said slag into an electric furnace, passing said slag in molten state over and in contact with a molten iron bath containing dissolved carbon in which the concentration of dissolved carbon in said molten bath is between 0.01% and 0.5%, thereby to effect endothermic reactions in said slag between said zinc oxide forming zinc metal vapor which rises from the slag and between said copper oxide and tin oxide and a part of said iron oxide forming copper, tin and iron metals which enter into said molten iron bath and thereby concurrently removing carbon from said bath; concurrently supplying sufficient heat input into said furnace to maintain said bath molten and at a substantially constant temperature as said reducing reactions proceed; concurrently supplying additional carbon to said bath to maintain the concentration of dissolved carbon therein between .01% and 0.5%; said carbon being added at a rate which reduces the iron oxide in said slag to an extent which produces a spent slag having a mol ratio $FeO/SiO_2$ less than unity; withdrawing separately from said furnace said spent slag, said zinc vapors and said molten iron containing copper and tin.

References Cited in the file of this patent

UNITED STATES PATENTS

| | | |
|---|---|---|
| 976,557 | Dawson | Nov. 22, 1910 |
| 1,146,075 | Johnson | July 13, 1915 |
| 1,155,628 | Truax | Oct. 5, 1915 |
| 1,712,641 | Aarts | May 14, 1929 |
| 2,027,300 | Claassen | Jan. 7, 1936 |
| 2,509,326 | Weaton et al. | May 30, 1950 |
| 2,543,420 | Ogg | Feb. 27, 1951 |